United States Patent [19]

Yamazaki et al.

[11] Patent Number: 5,002,919

[45] Date of Patent: Mar. 26, 1991

[54] CATALYST COMPOSITION FOR HYDROGENATION OF HEAVY HYDROCARBON OIL AND PROCESS FOR PRODUCING THE CATALYST

[75] Inventors: Hatsutaro Yamazaki, Saitama; Takeshi Tomino, Ibaragi; Kazushi Usui, Chiba; Tomohiro Yoshinari; Takuo Suzuki, both of Saitama, all of Japan

[73] Assignee: Cosmo Oil Company & Petroleum Energy Center, Tokyo, Japan

[21] Appl. No.: 394,441

[22] Filed: Aug. 16, 1989

[30] Foreign Application Priority Data

Aug. 18, 1988 [JP] Japan .................................. 63-205510

[51] Int. Cl.$^5$ .......................... B01J 23/68; B01J 23/85
[52] U.S. Cl. ..................................... 502/315; 502/313; 502/314; 502/316
[58] Field of Search ................ 502/313, 314, 315, 316

[56] References Cited

U.S. PATENT DOCUMENTS

| | | |
|---|---|---|
| 3,383,301 | 5/1968 | Beuther et al. ................. 502/314 X |
| 4,271,042 | 6/1981 | Oleck et al. ......................... 502/314 |
| 4,341,625 | 7/1982 | Tamm ............................. 502/315 X |
| 4,460,707 | 7/1984 | Simpson ............................. 502/315 |
| 4,642,179 | 2/1987 | Morales et al. ................. 502/314 X |

*Primary Examiner*—W. J. Shine

*Attorney, Agent, or Firm*—Sughrue, Mion, Zinn, Macpeak & Seas

[57] ABSTRACT

A catalyst composition for the hydrogenation of heavy hydrocarbon oil comprising at least one active ingredient for hydrogenation supported on a porous refractory oxide carrier and which has the following characteristics:

(1) the mean pore diameter of the pores thereof is in the range of 130 to 250 Å;
(2) the volume of pores having a pore diameter within ±30 Å of the mean pore diameter is in the range of from not less than 30% to less than 60% of the total volume of the pores;
(3) the volume of pores having a pore diameter of not larger than 80 Å is not more than 13% of the total volume of the pores;
(4) the volume of pores having a pore diameter of not smaller than 350 Å is not more than 25% of the total volume of the pores; and
(5) the ratio (mm$^2$/mm$^3$) of the outer surface of a molded catalyst particle to the volume thereof is in the range of 3 to 8. There are also disclosed a process for producing the catalyst composition and a process for hydrogenating heavy hydrocarbon oil, the latter of which comprise contacting heavy hydrocarbon oil with the catalyst composition in the presence of hydrogen.

34 Claims, 1 Drawing Sheet

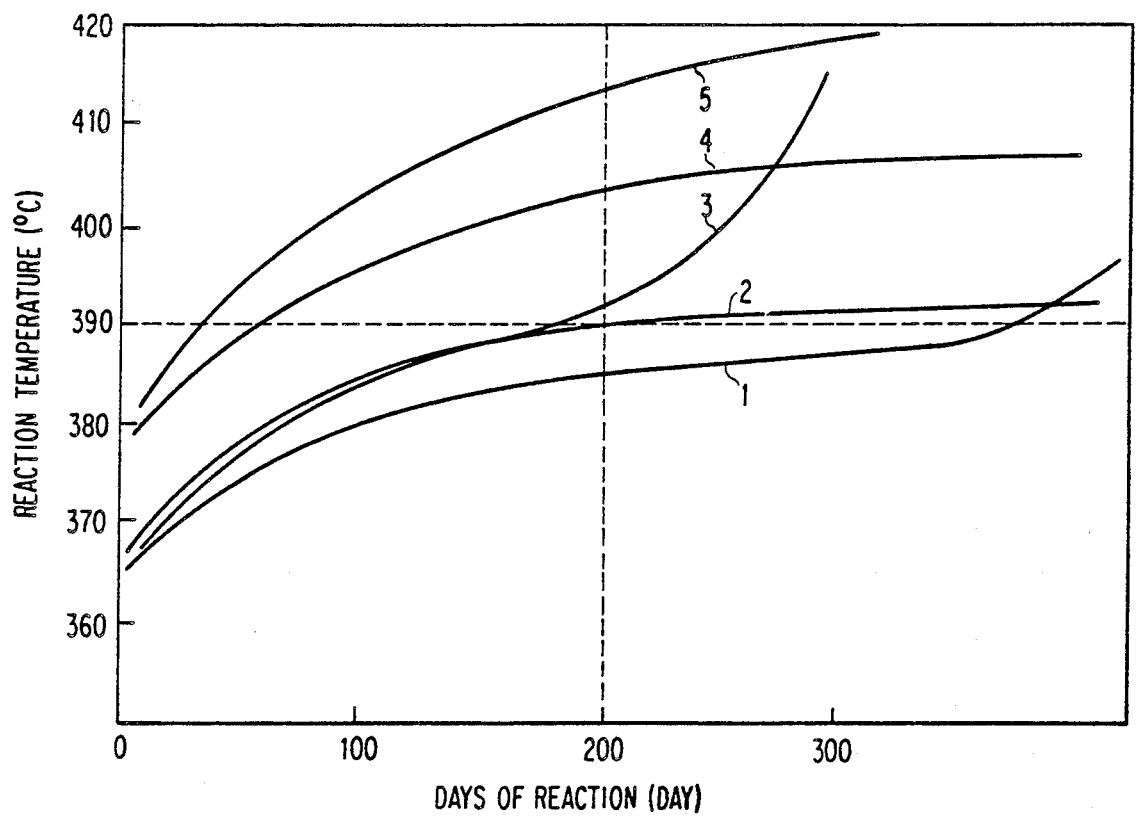

CATALYST COMPOSITION FOR HYDROGENATION OF HEAVY HYDROCARBON OIL AND PROCESS FOR PRODUCING THE CATALYST

FIELD OF THE INVENTION

This invention relates to hydrogenation of a hydrocarbon composition in the presence of an improved catalyst and more particularly to a catalyst composition for the hydrogenation of heavy hydrocarbon oil to remove asphaltene or metals or to desulfurize the oil, the catalyst composition comprising an improved catalyst having a specific relatively broad pore size distribution. It also relates to a process for hydrogenating the heavy hydrocarbon oil in the presence of the catalyst composition.

BACKGROUND OF THE INVENTION

Processes for hydrogenating heavy hydrocarbon oil (hereinafter referred to simply as heavy oil) containing large amounts of asphaltene and heavy metals such as nickel and vanadium to convert the oil into desulfurized hydrocarbon oil having a low asphaltene content and increased value have been intensively studied.

When heavy oil is hydrogenated, the loading of poisoning materials per unit quantity of catalyst is high due to the presence of asphaltene or heavy metal compounds at high concentrations in the heavy oil. As a consequence, the activity of the catalyst is rapidly decreased. Asphaltene which is dispersed as colloidal particles in the heavy oil is a macromolecule. When conventional hydrodesulfurization catalysts are used, asphaltene creates high resistance to diffusion of oil in catalyst particles and coke is formed in great quantities on the surfaces of the catalyst particles, catalyst activity is rapidly decreased and the desired reactions are hindered in a short period of time. Further, heavy metals such as nickel and vanadium in the heavy oil are deposited on the surfaces of the catalyst particles and the catalyst is also poisoned by such heavy metals, that is, catalyst activity is rapidly decreased. Therefore, the catalyst must be replaced with fresh catalyst and cost is increased. In some cases, heavy oil is no longer treated by refinerys.

In carrying out the hydrodesulfurization of heavy oil of relatively good quality having an asphaltene content of not higher than about 2% and a heavy metal content of not higher than about 50 ppm with conventional processes, hydrodesulfurization catalysts having pores of a relatively small pore size of about 60 to 110 Å are used. (Unless otherwise indicated, all percent and ppm are by weight.) In the hydrodesulfurization of heavy oil containing large amounts of asphaltene and heavy metals such as heavy oil having an asphaltene content of as high as more than about 3% and a heavy metal content of as high as more than about 50 ppm, poisoning materials are deposited due to the presence of asphaltene (a high molecular weight colloid) or the heavy metal compounds in substantial quantities, catalyst activity is decreased and the catalysts are deteriorated to such an extent that they can be no longer used.

When the deteriorated catalysts are taken out and analyzed, it is found that vanadium and nickel are deposited on the surface layer of the catalyst particles, pores on the surface layer are clogged and heavy oil cannot diffuse into the interior of the catalyst particles. Accordingly, it is necessary to adjust the pore distribution of the catalyst and to improve the shape of molded catalyst particles to allow the diffusion and penetration of the heavy oil into the interior of the catalyst particles to be accelerated despite the presence, of asphaltene or the content and molecular structure of the heavy metal compounds which poison the catalyst in the hydrogenation of heavy oil.

Attempts have been made to charge catalysts which have a large pore size for removing only metals in the first stage of a reactor, this stage accounting for 10 to 50% of the total capacity of the reactor, to overcome the above problem. However, this approach involves a serious disadvantage: since the pore size of the catalyst charged into the first stage is large, the active surface area of the catalyst is small and the desulfurization capability in the reaction is low from the start.

In JP-B-47-40683 (the term "JP-B" as used herein means an "examined Japanese patent publication"), JP-A-54-125192 (the term "JP-A" as used herein means an "unexamined published Japanese patent application") and JP-A-57-201533, there are proposed catalysts wherein passages only for diffusion are provided in the interior of the catalyst particles to permit raw oil to diffuse into the interior of the catalyst particles without greatly enlarging pore size.

In JP-B-47-40683, large-diameter passages having a size of 100 to 1000 Å or larger only for diffusion account for 20 to 30% of the total pores, and in the other two applications, large diameter passages having a size of about 500 Å or larger account for about 10 to 30% of the total pores so that the life of the catalyst is prolonged and desulfurization ability is improved, even when metals are deposited. However, the large diameter passages only for diffusion are themselves merely "spaces" which have no reaction activity and such spaces account for 10 to 30% of the whole of the pores. The provision of such spaces only for diffusion reduces the area of catalytic activity in the reactor which should be as high as possible.

Accordingly, to solve the above problems, there has been a great demand to discover a hydrogenation catalyst which is excellent in desulfurization performance as well as in metal removal activity, that is, which exhibits both desulfurization and metal removal functions.

SUMMARY OF THE INVENTION

The present inventors performed studies to solve the problems associated with the prior art as mentioned above. As a result, they have found that a catalyst composition comprising a catalyst having a specific relatively broad pore size distribution retains its activity over a long period of time without deteriorating even when metals are deposited thereon in the hydrogenation of a heavy hydrocarbon oil.

They further found that when the catalyst of the present invention is used in a first reaction zone (for a first stage hydrogenation) in a process comprising catalytically hydrogenating heavy hydrocarbon oil in a multi-stage reaction system it exhibits similar performance without causing a deterioration of the performance of desulfurization catalysts in second and subsequent reaction zones (for second and subsequent hydrogenations). The present invention was reached on the basis of the above findings.

It is one object of the present invention to provide a novel hydrogenation catalyst, which is particularly suitable for use in combination with conventional catalysts which have a pore size used as catalysts for desulfurization in second and subsequent hydrogenation zones in the catalytic hydrogenation of heavy oil, which catalyst of the invention has a long life when used to remove sulfur compounds and impurities (such as metals) and to decompose asphaltene to thereby improve heavy oil in quality. The present invention also provides a process for hydrogenating heavy oil in the presence of the catalyst of the present invention.

It is another object of the present invention to provide a novel catalyst which is useful in hydrogenating heavy oil to remove metals and which has a high capacity for accumulating metallic impurities and also to provide a process for hydrogenating heavy oil in the presence of such catalyst.

It is still another object of the present invention to provide a novel catalyst which can be used in a process for desulfurizing and hydrocracking the asphaltene component of heavy oil (whereby sludge can be prevented from being formed) while retaining high metal removing performance, and to provide a process for hydrogenating heavy oil in the presence of such catalyst.

The essential aspects of the present invention reside in a catalyst composition for the hydrogenation of heavy hydrocarbon oil and a process for hydrogenating heavy hydrocarbon oil in the presence of such catalyst composition, the catalyst composition being composed of at least one active ingredient for hydrogenation supported on a porous refractory oxide and having the following characteristic:

(1) the mean pore diameter of the pores of the catalyst is in the range of 130 to 250 Å;

(2) the volume of pores having a pore diameter within ±30 Å of the mean pore diameter is in the range of from not less than 30% to less than 60% of the total volume of the pores;

(3) the volume of pores having a pore diameter of not larger than 80 Å is not more than 13% of the total volume of the pores;

(4) the volume of pores having a pore diameter of not smaller than 350 Å is not more than 25% of the total volume of the pores; and (5) the ratio of the outer surface area of a molded catalyst particle to the volume thereof is in the range of 3 to 8 (mm²/mm³).

It is still a further object of the present invention to provide a process for catalytically hydrogenating heavy hydrocarbon oil in multi-stage reaction zones, characterized by that the catalyst used in the first reaction zone (it is used in the first reaction zone, preferably used in the first reaction zone among the first to third reaction zones) comprises at least one active ingredient for hydrogenation supported on a porous refractory oxide and which has the following characteristics:

(1) the mean pore diameter of the pores of the catalyst is in the range of 130 to 250 Å;

(2) the volume of pores having a pore diameter within ±30 Å of the mean pore diameter is in the range of from not less than 30 to less than 60% of the total volume of the pores;

(3) the volume of pores having a pore diameter of not larger than 80 Å is not more than 13% of the total volume of the pores;

(4) The volume of pores having a pore diameter of not smaller than 350 Å is not more than 25% of the total volume of the pores; and (5) the ratio (mm²/mm³) of the outer surface area of a molded catalyst particles to the volume thereof is in the range of 3 to 8. The mean pore diameter of the catalysts used in second and subsequent reaction zones is smaller than that of the catalyst used in the first reaction zone.

The hydrogenation includes desulfurization and cracking by the addition of hydrogen. The desulfurization means that the main reaction is a desulfurization process. The hydrodesulfurization means that the main reaction is a hydrodesulfurization process.

BRIEF DESCRIPTION OF THE DRAWING

The FIGURE is a graph obtained by plotting reaction temperature versus days of reaction when the reaction temperature is so controlled that the sulfur content of the product oil of the reaction becomes 0.3 wt % in a relative life test in a two-stage hydrodesulfurization process where the catalyst composition of Example 1 or 2, or Comparative Example 2, 3 or 4, is used in the first stage reaction zone and a conventional catalyst for desulfurization is used in the second stage reaction zone.

In the FIGURE, curves 1-5 show the results obtained with the below listed first and second stage catalysts.

Curve 1. Example 1/Comparative Example 5 (volume ratio: 30/70)

Curve 2. Example 2/Comparative Example 5 (volume ratio: 30/70)

Curve 3. Comparative Example 2/Comparative Example 5 (volume ratio: 30/70)

Curve 4. Comparative Example 3/Comparative Example 5 (volume ratio: 30/70)

Curve 5. Comparative Example 4/Comparative Example 5 (volume ratio: 30/70)

DETAILED DESCRIPTION OF THE INVENTION

The present invention is now illustrated in more detail.

The term "the total volume of pores" as used herein refers to the measured value obtained by measuring the total volume of the pores with a mercury porosimeter at 4225 kg/cm²·G (60,000 psig), because it is impossible to measure the total volume of the actual pores.

The mean pore diameter is determined as follows. The relationship between of the pressure (0 to 4225 kg/cm²·G) of a mercury porosimeter and the amount of mercury absorbed by the catalyst is determined and the mean pore diameter is determined from the pressure at which mercury in an amount of ½ of the amount absorbed at a pressure of 4225 kg/cm²·G is absorbed. The relationship of the pressure of the mercury porosimeter to the corresponding pore size is obtained by the following equation of Washburn et al:

$$rP = -2\gamma\cos\theta$$

wherein r is a pore radius, $\gamma$ is a surface tension of mercury (475 dyne/cm), $\theta$ is 130 degrees, which is a contact angle of mercury and solid, and P is a pressure of a mercury porosimeter.

In the catalyst composition of the present invention, the mean pore diameter of the pores is in the range of about 130 to about 250 Å, preferably about 140 to about 230 Å. When the mean pore diameter is too small, the pores of the outer surface of the catalyst particles are easily clogged by accumulated metal as the amount of accumulated metal impurities increase and the life of the catalyst is short, though desulfurization activity is increased. When the mean pore diameter is too large, the specific surface area is lowered and hydrodesulfurization activity is reduced, though metals of macromolecular compounds and asphaltene are easily diffused into the interior of the catalyst particles and metal removal is readily done without causing clogging of the pores by accumulated metallic impurities.

The volume of the pores having a pore diameter within ±30 Å of the mean pore diameter is not smaller than about 30%, but is less than 60% of the total volume of pores, preferably about 32 to 58%, more preferably about 35 to 55%, of the total volume of pores. When the proportion of the pores having a pore diameter within ±30 Å of the mean pore diameter is too high, that is, the pore size distribution is sharp, the number of pores having a large diameter is small or such pores are not present so that macromolecular metallic components and the asphaltene component poorly diffuse into the interior of the catalyst particles, the diffusion stage becomes the reaction rate determining step and the ability to remove metals and the ability to decompose asphaltene are reduced. When the proportion of such pores is too low, the desulfurization activity is lowered. In the catalyst composition of the present invention, pores having a medium pore size are relatively broadly distributed so that pores having a small pore size maintain the desulfurization activity and metallic components can be treated by pores having a relatively large pore size which do not cause a great lowering in desulfurization activity.

The volume of pores having a pore diameter of not larger than 80 Å is not more than about 13%, preferably not more than about 11%, and more preferably not more than about 9%, but not less than about 0.01%, of the total volume of the pores. Preferably, the volume of pores having a pore diameter of not smaller than about 100 Å accounts for about 90% or more of the total volume of pores. This catalyst property make it possible so that the asphaltene component containing most of the metallic impurities in heavy oil is allowed to be diffused into the active zone of the catalyst.

The volume of pores having a pore diameter of not smaller than about 350 Å is not more than 25%, preferably not more than about 20%, more preferably not more than about 15%, but not less than about 0.1%, of the total volume of the pores. When the ratio of pores having a pore diameter of not smaller than about 350 Å is increased, the effective surface area on the catalyst activity decreases.

The ratio (mm$^2$/mm$^3$) of the outer surface area of a catalyst particle to the volume thereof in the catalyst composition of the present invention is from about 3 to 8, preferably about 3.5 to 7. When the ratio of the outer surface are of a molded particle to the volume thereof is too low, sufficient effects can not be obtained, while when the ratio is too high, the molded catalyst particle is bulky, the packing density of the catalyst in the reactor is low, and desulfurization activity is decreased.

The total volume of the pores in the catalyst composition of the present invention is preferably not less than 0.4 ml/g, particularly preferably from about 0.5 to 0.9 ml/g. When the ratio of the total volume of pores is too low, metal retention is low and the catalyst is not practically useful.

The catalyst composition of the present invention is a hydrogenation catalyst comprising an active component for hydrogenation supported on a carrier, more preferably a hydrogenation catalyst composed of metals of Group VIb and/or Group VIII of the Periodic Table supported on a porous refractory oxide carrier.

Examples of porous refractory oxides include alumina, silica, magnesia, silica-magnesia, zirconia, silica-zirconia, titania and silica-titania. Usually, alumina or silica-alumina is used. The preferred refractory oxide is alumina. When the catalyst composition is a catalyst for desulfurization, the hydrogenation of asphaltene or metal removal by hydrogenation, an alumina such as γ-alumina, δ-alumina or θ-alumina is preferred as the refractory oxide. It is most preferred that the porous refractory oxide contains at least about 90% by weight, preferably at least about 95% weight, of γ-alumina.

Any conventional catalytically active ingredients for hydrogenation can be used as the active metal(s) of the hydrogenation catalyst to be supported on the porous refractory oxide. For example, there can be used at least one member selected from the group consisting of metals (e.g., chromium, molybdenum, tungsten, etc.) of Group VIb of the Periodic Table or the compounds of these metals and/or the metals (e.g., iron, cobalt, nickel, platinum, etc.) of Group VIII of the Periodic Table or the compounds of these metals.

The above-described catalysts can be prepared by conventional methods. The alumina carrier can be prepared by neutralizing an acidic aluminum salt such as aluminum sulfate or aluminum nitrate with a base such as ammonia, or neutralizing an aluminate such as sodium aluminate with an acidic aluminum salt or an acid, washing the resulting gel and carrying out conventional treatments such as heating, aging, molding, drying and calcining.

In the preparation of the carrier to impart the above-described characteristics to the catalyst composition of the present invention, it is preferred to add an acid or a basic nitrogen-containing compound to an alumina gel. It is also preferred to add an organic molding aid such as polyvinyl alcohol, polyethylene glycol or cellulose or an alcohol such as methyl alcohol, ethyl alcohol or n-butyl alcohol.

Examples of the acid include inorganic acids such as nitric acid and hydrochloric acid and organic acids such as formic acid, acetic acid, propionic acid and gluconic acid. Examples of the basic nitrogen-containing compounds include hydrazine, ammonia, aliphatic amines, aromatic amines and hetrocyclic amines. And in the above preparation, aqueous alminate and aqueous aluminum sulfate are added to adjust the pH to about 9.0 to 10. After filtration, aqueous ammonia is added to the obtained filtrate to adjust the pH to 12 and heating and ripening at about 95° C. for about 20 hours are conducted. The important factors are the temperature and the heating and ripening time. In a case of high temperature and long time, the pore particles tend to become large.

The carrier can be molded by any conventional method. Preferably, a carrier precursor such as a gel of the inorganic refractory oxide, for example, spray dried or peptized alumina gel, is extruded through a die having the desired size and shape. The extrudate is then cut into the desired length.

The prepared particles have a symmetrical cross section, and the average length of the particles is at least twice as long as the diameter of the cross section thereof. The term "diameter of the cross section" as used herein means the longest size of a cross section perpendicular to the longest axis of the particle. Preferably, the refractory oxide has a prismatic form, a form where circlets are put in the form of a trefoil and a form where circlets are put in the form of a quatre foil. The diameter of the cross-section of the particle is generally about 0.6 to 3 mm, preferably about 1.0 to 1.7 mm.

With regard to the shape of the catalyst particle, there is no particular limitation thereon. The catalyst particle may be in the form of any of a cylinder, a trefoil, a quatrefoil or other shapes, so long as the ratio ($mm^2/mm^3$) of the outer surface area of the molded catalyst particle to the volume thereof is about 3 to 8, preferably about 3.5 to 7.

In the preparation of the catalyst of the present invention, it is preferred that the initial carrier particle has the same pore volume distribution as that of the final catalyst particle. However, this is not essential.

It should be noted that when an active metal(s) such as nickel and/or molybdenum is/are supported on the carrier particles, the contact angle of mercury is changed so that the pore diameter in the final catalyst is liable to become larger by 10 to 20 Å than that of the carrier particle without the active metal(s). However, even though the mean pore diameter of the carrier particle is slightly smaller than the desired value, the final catalyst composition required can be obtained by the subsequent impregnation, calcining and other catalyst manufacturing stages. The carrier particles have a surface area of at least 100 $m^2/g$, generally about 100 to 300 $m^2/g$, preferably about 125 to 275 $m^2/g$ as measured by B.E.T method.

A preferred method is one where catalyst or carrier particles having a pore diameter of substantially about 130 to about 250 Å, preferably about 140 to about 230 Å are previously molded, crushed into powder having an appropriate particle size and re-molded to form the desired relatively broad pore size distribution.

The metallic components of Group VIb and/or Group VIII can be supported on the porous refractory oxide by conventional methods. For example, these active hydrogenation ingredients can be supported on the carrier by bringing a solution containing the active ingredients into contact with the carrier, for example, by immersing the carrier in the solution, kneading the carrier with the solution, allowing the solution to drop on the carrier, or depositing the active ingredients on the carrier by immersing the carrier in the solution and adding a precipitating medium thereto. As the precipitating agent, for example, aqueous ammonia is used. The addition amount is more than the molar amount of the active hydrogenation ingredient. When the metals of Group VIb and Group VIII are used in combination, either one may be supported on the carrier and then the other may be supported thereon. Alternatively, both may be simultaneously supported on the carrier.

Examples of nickel compounds which can be used in solutions include nickel nitrate, sulfate, fluoride, chloride, bromide, acetate, carbonate and phosphate. Examples of molybdenum compounds which can be used in solutions include ammonium paramolybdate, molybdic acid, ammonium molybdate, ammonium phosphomolybdate and phosphomolybdic acid. Other metallic compounds which can be used are known by those in the art.

It is preferred to carry out molding, drying, firing, etc., in a conventional manner after the above treatments. It is preferred that drying be carried out by keeping the catalyst at a temperature of room temperature to about 150° C., particularly about 100° to 120° C., for at least about 5 hours, particularly for about 12 to 24 hours in air. It is also preferred that calcination (firing) be carried out by keeping the catalyst at a temperature of about 350° to 600° C., particularly about 400° to 550° C., for at least 3 hours, particularly about 12 to 24 hours. The alumina carrier may be dried in air and calcined (fired) in the atmosphere under the conditions described above. The physical properties of the catalyst are shown in Table 1.

TABLE 1

| | Broad range | Preferred range | Most preferred range |
|---|---|---|---|
| Mean pore diameter (Å) | 130 to 250 | 140 to 230 | 140 to 210 |
| Ratio of the volume of pores having a pore diameter within ±30 Å of the mean pore diameter to the total volume of pores (%) | 30 to 60 | 32 to 58 | 35 to 55 |
| Ratio of the volume of pores having a pore diameter of not larger than 80 Å to the total volume of pores (%) | 13 or less | 11 or less | 9 or less |
| Ratio of the volume of pores having a pore diameter of not smaller than 350 Å to the total volume of pores (%) | 25 or less | 20 or less | 15 or less |
| Ratio of outer surface area of catalyst to the volume thereof ($mm^2/mm^3$) | 3 to 8 | 3.5 to 7 | 3.5 to 7 |

The hydrogenation catalyst contains up to about 10% by weight, generally from 2 to 6% by weight (in terms of monoxide), of Group VIII metal and/or up to about 30% by weight, generally from 3 to 28% by weight (in terms of trioxide), of Group VIb metal.

When the catalyst is used in the form of a sulfide, it is preferred to presulfurize the catalyst. Many hydrogenation catalysts are used to improve hydrocarbons containing sulfur in quality. As an alternative method, the catalyst as such can be sulfurized under high temperature and high pressure conditions by using a hydrocarbon oil containing about 1.0% by weight or more of sulfur. The presulfurization is conducted by subjecting hydrogen containing about 10% $H_2S$ or vacuum gas oil to gradually rising from room temperature to about 350° C. for about 2 or 3 days under hydrogen.

Examples of heavy oils treated in the present invention include topping residual oil and vacuum residue of crude oil, synthetic oil obtained by subjecting oil shale, tar sand or bitumen to extraction, desulfurized heavy oil obtained by directly treating crude oil by a desulfurizing process, deasphalted oil obtained by treating crude oil by a solvent deasphalting process, product oil from the liquefaction of coal, residual oil obtained from such processed and mixed oils thereof. Generally, these heavy oils contain asphaltene, heavy metals, sulfur compounds, nitrogen compounds, etc.

Examples of these heavy oils include topping residual oil (specific gravity (D15/4): 0.9881, asphaltene: 7.12%, Ni: 43 ppm, V: 110 ppm, sulfur: 4.31%, nitrogen: 3100 ppm) of crude oil (Arabian heavy) from the Middle east; topping residual oil (specific gravity (D15/4): 0.9888, asphaltene: 8.05%, Ni: 30 ppm, V: 93 ppm, sulfur: 4.410%, nitrogen: 3000 ppm) of crude oil (Khafji) from the Middle east; vacuum residual oil (specific gravity (D15/4): 1.03, asphaltene: 8.9%, Ni: 130 ppm, V: 450 ppm, nitrogen: 7800 ppm) of crude oil (Iranian heavy) from the Middle east; and crude oil (specific gravity (D15/4): 1.004, asphaltene: 11.8%, Ni: 300 ppm, V: 1250 ppm, sulfur: 5.36%, nitrogen: 5750 ppm) from South America (Boscan).

Other examples of heavy oils include oil sand oil (specific gravity (D15/4): 0.9996, asphaltene: 7.9%, Ni: 71 ppm, V: 250 ppm, sulfur: 4.8%, nitrogen: 3800 ppm) from Athabasca, Canada; oil sand oil (specific gravity (D15/4): 1.0078, asphaltene: 8.6%, Ni: 74 ppm, V: 180 ppm, sulfur: 4.5%, nitrogen: 4200 ppm) from Cold Lake, Canada; oil sand oil (specific gravity (D15/4): 1.0131, asphaltene: 10.2%, Ni: 100 ppm, V: 470 ppm, sulfur: 3.4%, nitrogen: 6300 ppm) from Cerro Negro, Venezuela; and oil shale oil (specific gravity (D15/4): 0.8894, asphaltene: 0.55%, Ni: 1000 ppm, V: 3400 ppm, sulfur: 4.5%, nitrogen: 11500 ppm) from Landor, Australia.

As described earlier, these heavy oils contain large amounts of asphaltene, sulfur compounds, nitrogen compounds and heavy metal compounds such as nickel and vanadium compounds.

It is preferred that the catalyst composition of the present invention be used for desulfurization. Particularly, the degree of metal removal by hydrogenation or the degree of hydrocracking of asphaltene can be enhanced. Generally, the catalyst is placed in a fixed bed reactor or a fluidized bed reactor. Oil to be treated is introduced into the reactor and treated at a high temperature and pressure under the desired hydrogen partial pressure to carry out desulfurization, nitrogen removal, decomposition of asphaltene and metal removal. Generally, the catalyst is placed in a fixed bed reactor and oil is treated. The catalyst may be put into a single reactor or plural reactors successively connected. For example, it is preferred to use a multi-stage reactor composed of one or two reactors containing the catalyst of the present invention and another reactor or reactors containing some other hydrogenation catalyst(s).

Alternatively, the catalyst of the present invention together with one or more other hydrogenation catalysts may be packed into a single reactor.

The catalyst of the present invention is used in a first reaction zone when heavy oil is catalytically hydrogenated in one or more reaction zones containing different hydrogenation catalysts.

The catalyst used in the later stage(s) (second and subsequent reaction zones) is a catalyst having a mean pore diameter smaller than that of the catalyst used in the first stage. Conventional desulfurization catalysts (e.g., U.S. Pat. Nos. 3,980,552 and 3,966,644) can usually be used in the second and subsequent stages. Generally, conventional desulfurization catalysts are composed of one or more active hydrogenation components supported on a porous refractory oxide carrier and have a mean pore diameter of not larger than about 110 Å, preferably from about 70 to 90 Å. It is preferred that the surface area thereof be as large as possible, preferably about 100 m$^2$/g to about 300 m$^2$/g. Conventional carriers can be used for the desulfurization catalysts. Preferred examples of the carriers are alumina and silica-alumina. Examples of metals supported thereon include metals of Group VIb and/or Group VIII of the Periodic Table such as molybdenum, tungsten, cobalt, nickel and iron.

In the hydrogenation process according to the present invention, the catalyst plays a role as a catalyst for the hydrocracking of metal components and the asphaltene component(s) in the heavy oil in the first reaction zone and for the protection of the desulfurization catalyst in the latter stage(s) (second and subsequent stages).

The catalyst of the present invention is packed into the first stage and a conventional desulfurization catalyst(s) is/are packed into the latter stage(s). Thus, the hydrogenation of heavy oil can be carried out by a method using a given reactor at high efficiency. In a preferred embodiment of the present invention, hydrocarbon oil containing at least about 50 ppm (in total) of metallic impurities is first brought into contact with the catalyst having high capacity to accumulate metallic impurities according to the present invention. The resulting product is then desulfurized in a second reaction zone. The hydrogenation reaction is carried out in each reaction zone, at a temperature of about 260° to 480° C., preferably about 310° to 460° C., and at a liquid hourly space velocity of about 0.05 to 3.0 hr$^{-1}$, preferably about 0.1 to 1.5 hr$^{-1}$, under a hydrogen pressure of about 45 to 210 kg/cm$^2$·G, preferably about 70 to 175 kg/cm$^2$·G and the feed ratio of hydrogen to raw oil is from about 500 to 2800 M$^3$/l. The ratio of the metal removal and desulfurization of the desulfurized oil obtained from the latter stage is typically at least 60%, sometimes 85% (the percentages are by weight of the initial starting metal and the initial sulfur) or higher, based on the metal and sulfur contents of the heavy oil feedstock. In the present invention, heavy oils can be treated under the above conditions by using only a catalyst of the present invention.

The catalyst composition of the present invention has specific catalytic physical properties so that it performs as an excellent bifunctional catalyst having functions as a conventional desulfurization catalyst and/or conventional metal removing catalyst. Hence, the life of the catalyst is prolonged as compared with a conventional desulfurization catalyst. Further, when the catalyst of the present invention is used as a first hydrogenation catalyst and a conventional desulfurization catalyst is used as the second hydrogenation catalyst in a catalytic hydrogenation process having a two stage reaction zone, a very high degree of desulfurization can be obtained and asphaltene fractions which cause the formation of sludge can be removed.

The present invention is now illustrated in greater detail by reference to the following Examples and Comparative Examples. Evaluation of the catalyst compositions obtained in the Examples and Comparative Examples was made in the following manner. Before feeding the heavy oil as a raw material, the catalyst was pre-sulfurized. Specifically, the presulfurization is carried out by introducing hydrogen containing about 10% H$_2$S, rising 100° C. to 200° C. by 20° C./min, rising 200° C. to 370° C. by 20° C./min, and maintaining 370° C. for 2 hours.

Evaluation test on relative activity of hydrodesulfurization and metal removal Evaluation of the relative activity of hydrodesulfurization and metal removal reactions on topping residual oil from Arabian heavy was done by determining the sulfur content (wt %) and metal removal (%) (the percentages are by weight of initial starting sulfur and metal contents) of the reaction product on the 25th day (the sulfur content of the reaction product was low when the reaction was started up, but the sulfur content increased and stabilized with the passage of the time so that the sulfur content on the 25th day was used) by using a fixed bed reactor having an inner diameter of 14 mmφ using a one stage reaction zone. The properties of the feedstock and test conditions were as follows.

| Properties of feedstock (topping residual oil from Arabian heavy) | |
|---|---|
| Specific gravity (15/4° C.) | 0.9881 |
| Sulfur content (wt %) | 4.31 |
| Nitrogen content (wt %) | 0.31 |
| Carbon residue (wt %) | 13.8 |
| Asphaltene (wt %) | 7.12 |
| Nickel (ppm) | 30 |
| Vanadium (ppm) | 96 |
| Test conditions | |
| Reaction temperature, °C. | 390 |
| Reaction pressure, kg/cm$^2$ · G | 105 |
| Liquid hourly space velocity, hr$^{-1}$ | 0.5 |
| Ratio of hydrogen/oil, Nm$^3$/kl | 930 |

Durability test on the accumulation of metal

Durability testing on the accumulation of metal was made using Boscan crude oil having an ultra-high metal content in place of topping residual oil from Arabian heavy. The durability evaluation was with reference to the number of days (life) until the desulfurization rate in the product oil was reduced to 30% based on the sulfur content of a raw oil (in this case, sulfur content of the product oil was 3.44 wt %) and the amount of metals accumulated by passing the raw oil with hydrogen through the reaction zone using the first stage fixed bed reactor.

| Properties of heavy oil (Boscan crude oil) | |
|---|---|
| Specific gravity (15/4° C.) | 0.9994 |
| Sulfur content (wt %) | 4.91 |
| Nitrogen content (wt %) | 0.57 |
| Viscosity (50° C.) (cst) | 5315 |
| Pour point (°C.) | +100 |
| Nickel (ppm) | 110 |
| Vanadium (ppm) | 1200 |
| Carbon residue (wt %) | 16.4 |
| Asphaltene (wt %) | 12.9 |
| Reaction temperature, °C. | 395 |
| Reaction pressure, kg/cm$^2$ · G | 105 |
| Liquid hourly space velocity, hr$^{-1}$ | 0.5 |
| Ratio of hydrogen/oil, Nm$^3$/kl | 1780 |

Test on the relative life of hydrodesulfurization and metal removal

The relative life test of hydrodesulfurization and metal removal of topping residual oil of Arabian heavy was made using a fixed bed reactor having an inner diameter of 30 mmφ and a two stage reaction zone (which separated two reaction zones to prevent two types of catalyst from mixing). The effect of reaction temperature on life was examined. The same feedstock as that used for the test on relative activity of hydrodesulfurization and metal removal was used. The test conditions were such that reaction pressure was 145 kg/cm$^2$·G, liquid hourly space velocity was 0.22 hr$^{-1}$ and the ratio of hydrogen/oil was 1000 Nm$^3$/kl. In the range of about 360° C. to about 420° C., the reaction temperature was controlled so that the sulfur content of product oil became 0.3 wt %.

Product oil (sulfur content: 0.3 wt %) on the 200th day of reaction was distilled under vacuum. The sulfur content of the vacuum residue boiling at not lower than 566° C. (1050° F.) was measured. The amount of sludge formed from each of the product oil produced on the 200th day of reaction and of the product oil obtained when the reaction temperature reached 390° C. was measured. The temperature of 390° C. is a yearly used average temperature. A comparative evaluation on the amounts of sludge formed was made according to Stability Test of Heavy Oil (a report on the comparison testing of bunker heavy oil stability, third meeting (1974), Japan Petroleum Institute). One drop of product oil was allowed to drop on a test paper. The test paper was left to stand in a constant temperature tank at 100° C. for one hour. Comparison was made on the basis of a standard spot as defined in the report (this is later referred to as the spot test).

EXAMPLES 1 to 3

2.33 kg of aluminum nitrate Al(NO$_3$)$_3$.9H$_2$O was dissolved in 6 l of distilled water. While stirring, the resulting aqueous solution was added to a mixture of 2.8 kg of 28% ammonia water and 6 l of distilled water. During the addition, the aqueous solution was kept at a pH of not lower than 9. The addition of the aqueous solution of Al(NO$_3$)$_3$ was conducted slowly so as to not cause a localized lowering in pH. The mixture as such was stirred for 4 hours and allowed to stand. The suspension which formed was filtered. The resulting precipitate was retained in 8 l of an aqueous solution of 1N ammonium carbonate at 50° C. for 12 hours to age it. The mixture was cooled, filtered and dehydrated. The precipitate was washed with 12 l of 0.2% ammonia water. The precipitate, which was recovered by filtration and washed with water, was extruded into a quatrefoil of 1/20 inch (1.25 mm) in diameter to obtain a carrier. The resulting carrier was impregnated with an aqueous solution of ammonium molybdate [(NH$_4$)$_6$Mo$_7$O$_{24}$.4H$_2$O] to support the molybdenum component on the carrier. The carrier was dried at 120° C. in air, heated at 550° C. for about 5 hours, and cooled to room temperature. A nickel component was then supported on the carrier. The carrier was impregnated with an aqueous solution of nickel nitrate [Ni(NO$_3$)$_3$.6H$_2$O]. The impregnated carrier was dried at 120° C. in air and calcined at 450° C. in air for about 5 hours to prepare a catalyst containing the molybdenum component and the nickel component as active components, the catalyst having a composition consisting of 12.0 wt % (in terms of MoO$_3$) molybdenum component, 4.0 wt % (in terms of NiO) nickel component, the balance γ-alumina.

The catalyst of Example 1 was obtained by extruding the carrier into a quatrefoil and the catalysts of Examples 2 and 3 were obtained by extruding the carrier into a cylindrical shape. In these Examples, the extrusion pressure was controlled. The catalysts of Examples 2 and 3 were prepared in the same manner as in Example 1 except that the aging temperature in the aqueous solution of ammonium carbonate was 80° C.

The characteristics of the catalysts of Examples 1 to 3 are shown in Table 2.

TABLE 2

| Catalyst | Ex. 1 | Ex. 2 | Ex. 3 |
|---|---|---|---|
| Total volume of pores (ml/g) | 0.58 | 0.62 | 0.62 |
| Mean pore diameter (Å) | 140 | 205 | 176 |
| Ratio of the volume of pores having a pore diameter within ±30 Å of the mean pore diameter to the total volume of pores (%) | 37 | 51 | 49 |
| Ratio of the volume of pores having a pore diameter of not larger than 80 Å to the total volume of pores (%) | 7.5 | 0.2 | 0.4 |
| Ratio of the volume of pores having a pore diameter of not smaller than 350 Å to the total volume of pores (%) | 3.1 | 21.2 | 12.5 |
| Ratio of outer surface area of catalyst to the volume thereof (mm²/mm³) | 4.8 | 3.1 | 3.1 |
| Shape of molded catalyst particle | quatrefoil | cylinder | cylinder |
| mmϕ × mmL | 1.3(1) × 3.5 | 1.3 × 3.5 | 1.3 × 3.5 |

Note(1)Maximum diameter

COMPARATIVE EXAMPLES 1 to 5

In Comparative Examples 1 to 4, active components were supported on a carrier in a manner similar to that of Examples 1 to 3 to prepare each catalyst.

In Comparative Example 1, the mean pore diameter was 110 Å, the volume of pores having a pore diameter within ±30 Å of the mean pore diameter was 70% of the total volume of pores. Thus, the pore size distribution was sharp.

In Comparative Example 2, the mean pore diameter was nearly the same as that of the catalyst of Comparative Example 1, the volume of pores having a pore diameter within ±30 Å of the mean pore diameter was 40% of the total volume of pores. Thus, the pore size distribution was broad.

In Comparative Example 3, the mean pore diameter was 170 Å and the volume of pores having a pore diameter within ±30 Å of the mean pore diameter was 75% of the total volume of pores so that the pore diameter was relatively large and the pore size distribution was sharp.

In Comparative Example 4, the catalyst was prepared so as to give a relatively large mean pore diameter.

The catalyst of Comparative Example 5 was a commercially available desulfurization catalyst composed of 12.4 wt % (in terms of MoO₃) molybdenum component and 3.5 wt % (in terms of CoO) cobalt component as active hydrogenation components supported on an γ-alumina carrier.

The characteristics of the catalysts of Comparative Examples 1 to 5 are shown in Table 3.

TABLE 3

| Catalyst | Comp. Ex. 1 | Comp. Ex. 2 | Comp. Ex. 3 | Comp. Ex. 4 | Comp. Ex. 5 |
|---|---|---|---|---|---|
| Total volume of pores (ml/g) | 0.60 | 0.58 | 0.60 | 0.62 | 0.50 |
| Mean pore diameter (Å) | 110 | 110 | 170 | 340 | 62 |
| Ratio of the volume of pores having a pore diameter within ±30 Å of the mean pore diameter to the total volume of pores (%) | 70 | 40 | 75 | 18 | 92 |
| Ratio of the volume of pores having a pore diameter of not larger than 80 Å to the total volume of pores (%) | 17.2 | 21.8 | 0.3 | 3.2 | 87 |
| Ratio of the volume of pores having a pore diameter of not smaller than 350 Å to the total volume of pores (%) | 2.9 | 3.0 | 6.1 | 47.6 | 4.0 |
| Ratio of outer surface area of catalyst to the volume thereof (mm²/mm³) | 3.1 | 3.1 | 3.1 | 3.1 | — |
| Shape of molded catalyst particle | cylinder | cylinder | cylinder | cylinder | trefoil |
| mmϕ × mmL | 1.3 × 3.5 | 1.3 × 3.5 | 1.3 × 3.5 | 1.3 × 3.5 | 1.3(2) × 3.5 |

Note(2)Maximum diameter

The test results of the testing on the evaluation of the relative activity of the hydrodesulfurization and metal removal of the catalysts of Examples 1 to 3 are shown in Table 4. The results of durability testing on the accumulation of metals are shown in Table 5.

Each of the catalysts of Examples 1 and 2 and Comparative Examples 2 to 4 as the first stage catalyst was used in combination with the catalyst of Comparative Example 5 (commercially available desulfurization catalyst) as the second stage catalyst in the relative life test of hydrodesulfurization and metal removal. The ratio of the first stage catalyst to the second stage catalyst in each catalyst system was 30/70 (in % by volume).

The FIGURE is a graph showing the test results from which the hydrodesulfurization activity of each catalyst can be seen in comparison with the other catalysts. Further, the sulfur concentrations of vacuum residues (boiling at not lower than 1050° F. (566° C.)) obtained by vacuum distilling product oil on the 200th day in the relative life test of hydrodesulfurization and metal removal are shown in Table 6. The results on the aforesaid spot test are shown in Table 7.

TABLE 4

| Catalyst | Sulfur content of product oil (wt %) | Metal removal (%) |
|---|---|---|
| Ex. 1 | 1.62 | 59.0 |
| Ex. 2 | 2.09 | 47.5 |
| Ex. 3 | 1.74 | 48.2 |
| Comp. Ex. 1 | 1.47 | 42.5 |
| Comp. Ex. 2 | 1.53 | 43.0 |

TABLE 4-continued

| Catalyst | Sulfur content of product oil (wt %) | Metal removal (%) |
| --- | --- | --- |
| Comp. Ex. 3 | 1.80 | 47.1 |
| Comp. Ex. 4 | 2.37 | 39.1 |
| Comp. Ex. 5 | 1.12 | 28.0 |

TABLE 5

| Catalyst | Life till desulfurization is reduced to 30% (days) | Amount of metal accumulated till end of catalystlife (g/g of catalyst) |
| --- | --- | --- |
| Ex. 1 | 30 | 0.55 |
| Ex. 2 | 35 | 0.54 |
| Ex. 3 | 31 | 0.54 |
| Comp. Ex. 1 | 17 | 0.26 |
| Comp. Ex. 2 | 21 | 0.35 |
| Comp. Ex. 3 | 25 | 0.41 |
| Comp. Ex. 4 | 15 | 0.23 |
| Comp. Ex. 5 | 6 | 0.11 |

TABLE 6

| Catalyst combination (first stage/latter stage) | Sulfur concentration in vacuum residue (wt %) |
| --- | --- |
| Ex. 1/Comp. Ex. 5 | 0.49 |
| Ex. 2/Comp. Ex. 5 | 0.48 |
| Comp. Ex. 2/Comp. Ex. 5 | 0.64 |
| Comp. Ex. 3/Comp. Ex. 5 | 0.60 |
| Comp. Ex. 4/Comp. Ex. 5 | 0.58 |

TABLE 7

| Catalyst combination (first stage/latter stage) | Product oil on the 200th day | Product oil when reaction temperature reached 390° C. |
| --- | --- | --- |
| Ex. 1/Comp. Ex. 5 | 1 | 1 |
| Ex. 2/Comp. Ex. 5 | 1 | 1 |
| Comp. Ex. 2/Comp. Ex. 5 | 3 | 2 or 3 |
| Comp. Ex. 3/Comp. Ex. 5 | 4 | 3 |
| Comp. Ex. 4/Comp. Ex. 5 | 5 | 2 |

Note: (amount of sludge: small) 1 ⇌ 5 (Amount of sludge: large)

It is apparent from the results of Table 4 (test results on the evaluation of the relative activity of hydrodesulfurization and metal removal) that the sulfur content of the product oil is greatly affected by the size of the pore diameter, i.e., a smaller pore diameter gives a product oil having a lower sulfur content and hence a smaller pore diameter is advantageous in desulfurization activity. The catalysts of Examples 1 to 3 are far superior to those of Comparative Examples 1 and 2 in the metal removal activity required in performance for the first hydrogenation catalyst and exhibit activity similar to or higher than that of the catalyst of Comparative Example 3, though the catalysts of Examples 1 to 3 are inferior to those of Comparative Examples 1 and 2 in desulfurization activity.

The catalyst of Comparative Example 4 is low in hydrodesulfurization activity as well as metal removal activity. That catalyst had a large mean pore diameter and was low in the ratio of the volume of pores having a pore diameter within ±30 Å of the mean pore diameter to the total volume of pores. Thus, the catalysts of Examples 1 to 3 have pore diameters and pore size distributions suitable for use in efficiently removing metallic components distributed in heavy oil from the viewpoint of protecting a desulfurization catalyst used in a later stage(s).

It is apparent from the results of Table 5 (durability test on the accumulation of metals) that the catalysts of Examples 1 to 3 have a high capacity for allowing very large amounts of metallic impurities to be accumulated from heavy oil of a high metal content.

The catalysts of Comparative Examples 1 and 2 do not show sufficiently improved catalyst life, though they exhibit high hydrodesulfurization activity in the evaluation test on relative activity of hydrodesulfurization and metal removal.

The catalysts of Examples 1 to 3 show a great improvement in the amounts of metals accumulated till end of life as compared with the catalysts of Comparative Examples 3 and 4 (the ratio of the volume of pores having a pore diameter within ±30 Å of the mean pore diameter to the total volume of the pores being high in Comparative Example 3 and the mean pore diameter being relatively large in Comparative Example 4).

The catalyst of Comparative Example 2 has pores having a pore diameter within ±30 Å of the mean pore diameter, the ratio of the volume of such pores to the total volume of pores being similar to those (37% and 51%) of the catalysts of Examples 1 and 2. The mean pore diameter of the catalyst of Comparative Example 3 is similar to that of the catalyst of Example 2. In the catalyst of Comparative Example 4, the volume of pores having a pore diameter of not smaller than 350 Å is 25% or more of the total volume of pores.

None of the catalysts of Comparative Examples 2, 3 and 4 shows a sufficiently improved catalyst life. Accordingly, it was an unexpected finding that the catalysts of Examples 1 and 2 had the above-described excellent effects.

It can be understood from the FIGURE that the catalyst of Comparative Example 2 has high hydrodesulfurization activity (catalyst composed of a combination of Comparative Example 2/Comparative Example 5) so that the initial reaction temperature is low, but the reaction temperature on and after 200 days rapidly rises and catalyst life is short. In the catalyst composed of a combination of Comparative Example 4/Comparative Example 5, hydrodesulfurization activity is low so that reaction temperature must be elevated at an early time. Thus, this combination is disadvantageous from the viewpoints of energy and cost.

In the catalyst of Comparative Example 3/Comparative Example 5, the initial temperature required is low, but the reaction temperature gradually rises with the passage of reaction time (days) and the number of days till the temperature rises to 400° C. is short. In the catalyst composed of a combination of Example 1 or 2 with Comparative Example 5, durability on the accumulation of metals is high so that lowering in hydrodesulfurization activity is small and initial activity can be kept over a long period of time. Further, the sulfur content in the product oil can be retained at a level of 0.3 wt % at a reaction temperature of not higher than 400° C. over a long period of time and the catalysts composed of the above combinations have a very long life.

In a catalyst which is a combination of the catalyst of Example 1 or 2 of the present invention, the vacuum residue (boiling at not lower than 1050° F. (566° C.)) has a low sulfur content. In the catalysts of the present invention, the mean pore diameter is relatively large and the pore size distribution is broad so that pores having a pore diameter of not smaller than the mean pore diameter have the effect of facilitating the diffusion of high boiling fractions in the interior of the catalyst particles. This is clear from the fact that vacuum residue has a high sulfur content when vacuum residual fractions are treated in the presence of a catalyst composed of a combination of Comparative Example 3/Comparative Example 5. In the spot test results of product oil, only the combinations with the catalysts of Examples 1 and 2 gave good results. This suggests that the catalysts are effective in the removal of the asphaltene component which is contained in vacuum residue and causes the formation of sludge in product oil.

While the invention has been described in detail and with reference to specific embodiments thereof, it will be apparent to one skilled in the art that various changes and modifications can be made therein without departing from the spirit and scope thereof.

What is claimed is:

1. A catalyst composition for the hydrogenation of heavy hydrocarbon oil comprising at least one active ingredient for hydrogenation supported on a porous refractory oxide carrier and which has the following characteristics:
   (1) the mean pore diameter of the pores thereof is in the range of 130 to 250 Å;
   (2) the volume of pores having a pore diameter within ±30 Å of the mean pore diameter is in the range of from not less than 30% to less than 60% of the total volume of pores;
   (3) the volume of pores having a pore diameter of not larger than 80 Å is not more than 13% of the total volume of pores;
   (4) the volume of pores having a pore diameter of not smaller than 350 Å is not more than 25% of the total volume of pores; and
   (5) the ratio ($mm^2/mm^3$) of the outer surface area of a molded catalyst particle to the volume thereof is in the range of 3 to 8.

2. A catalyst composition for the hydrogenation of heavy hydrocarbon oil as in claim 1, wherein the mean pore diameter of pores is in the range of 140 to 230 Å.

3. A catalyst composition for the hydrogenation of heavy hydrocarbon oil as in claim 1, wherein the volume of pores having a pore diameter within ±30 Å of the mean pore diameter is in the range of from not less than 32% to not more than 58% of the total volume of pores.

4. A catalyst composition for the hydrogenation of heavy hydrocarbon oil as in claim 1, wherein the volume of pores having a pore diameter within ±30 Å of the mean pore diameter is in the range of from not less than 35% to not more than 55% of the total volume of the pores.

5. A catalyst composition for the hydrogenation of heavy hydrocarbon oil as in claim 1, wherein the volume of pores having a pore diameter of not larger than 80 Å is not more than 11% of the total volume of pores.

6. A catalyst composition for the hydrogenation of heavy hydrocarbon oil as in claim 1, wherein the volume of pores having a pore diameter of not larger than 80 Å is not more than 9% of the total volume of pores.

7. A catalyst composition for the hydrogenation of heavy hydrocarbon oil as in claim 1, wherein the volume of pore having a pore diameter of not smaller than 100 Å is not less than about 90% of the total volume of pores.

8. A catalyst composition for the hydrogenation of heavy hydrocarbon oil as in claim 1, wherein the volume of pores having a pore diameter of not smaller than 350 Å is not more than 20% of the total volume of pores.

9. A catalyst composition for the hydrogenation of heavy hydrocarbon oil as in claim 1, wherein the volume of pores having a pore diameter of not smaller than 350 Å is not more than 15% of the total volume of pores.

10. A catalyst composition for the hydrogenation of heavy hydrocarbon oil as in claim 1, wherein the ratio ($mm^2/mm^3$) of the outer surface area of the molded catalyst particle to the volume thereof is in the range of 3.5 to 7.

11. A catalyst composition for the hydrogenation of heavy hydrocarbon oil as in claim 1, wherein the total volume of the pores is in the range of 0.5 to 0.9 ml/g.

12. A catalyst composition for the hydrogenation of heavy hydrocarbon oil as in claim 1, wherein the active ingredient for hydrogenation supported on the porous refractory oxide carrier is composed of at least one active metal for hydrogenation selected from the group consisting of metals of Group VIb of the Periodic Table or compounds of said metals and at least one member selected from the group consisting of metals of Group VIII of the Periodic Table or the compounds of said metals.

13. A catalyst composition for the hydrogenation of heavy hydrocarbon oil as in claim 12, wherein the amount of the active metal selected from among metals of Group VIb of the Periodic Table is 3 to 28 wt % (in terms of metal oxide).

14. A catalyst composition for the hydrogenation of heavy hydrocarbon oil as in claim 12, wherein the amount of the active metal for selected from among metals of Group VIII of the Periodic Table is 2 to 6 wt % (in terms of metal oxide).

15. A catalyst composition for the hydrogenation of heavy hydrocarbon oil as in claim 12, wherein the metal of Group VIb of the Periodic Table is chromium, molybdenum or tungsten.

16. A catalyst composition for the hydrogenation of heavy hydrocarbon oil as in claim 12, wherein the metal of Group VIII of the Periodic Table is iron, cobalt, nickel or platinum.

17. A catalyst composition for the hydrogenation of heavy hydrocarbon oil as in claim 1, wherein the heavy hydrocarbon oil is a topping residual oil or a vacuum residue of crude oil, a synthetic oil obtained by subjecting an oil shale, tar sand or bitumen to extraction; a desulfurized heavy oil obtained by directly treating a crude oil by a desulfurizing process; a deasphalted oil obtained by treating a crude oil by a solvent deasphalting process; a product oil from the liquefaction of coal, a residual oil obtained from the above-recited processes, or a mixture of the above oils.

18. A process for producing a catalyst composition for the hydrogenation of heavy hydrocarbon oil as claimed in claim 1, which comprises preparing a catalyst composition which is composed of at least one active ingredient for hydrogenation supported on a porous refractory oxide carrier and which has the following characteristics:
   (1) the mean pore diameter of the pores thereof is in the range of 130 to 250 Å;
   (2) the volume of the pores having a pore diameter within ±30 Å of the mean pore diameter is in the range of from not less than 30% to less than 60% of the total volume of the pores;

(3) the volume of the pores having a pore diameter of not larger than 80 Å is not more than 13% of the total volume of the pores;

(4) the volume of the pores having a pore diameter of not smaller than 350 Å is not more than 25% of the total volume of the pores; and (5) the ratio (mm$^2$/mm$^3$) of the outer surface area of a molded catalyst particle to the volume thereof is in the range of 3 to 8.

19. A process for producing a catalyst composition for the hydrogenation of heavy hydrocarbon oil as in claim 18, wherein the mean pore diameter of the pores is in the range of 140 to 230 Å.

20. A process for producing a catalyst composition for hydrogenation of heavy hydrocarbon oil as in claim 18, wherein the volume of pores having a pore diameter within ±30 Å of the mean pore diameter is in the range of from not less than 32% to not more than 58% of the total volume of the pores.

21. A process for producing a catalyst composition for the hydrogenation of heavy hydrocarbon oil as in claim 18, wherein the volume of pores having a pore diameter within ±30 Å of the mean pore diameter is in the range of from not less than 35% to not more than 55% of the total, volume of the pores.

22. A process for producing a catalyst composition for the hydrogenation of heavy hydrocarbon oil as in claim 18, wherein the volume of pores having a pore diameter of not larger than 80 Å is not more than 11% of the total volume of the pores.

23. A process for producing a catalyst composition for the hydrogenation of heavy hydrocarbon oil as in claim 18, wherein the volume of pores having a pore diameter of not larger than 80 Å is not more than 9% of the total volume of the pores.

24. A process for producing a catalyst composition for the hydrogenation of heavy hydrocarbon oil as in claim 18, wherein the volume of pores having a pore diameter of not smaller than 100 Å is not less than about 90% of the total volume of the pores.

25. A process for producing a catalyst composition for the hydrogenation of heavy hydrocarbon oil as in claim 18, wherein the volume of pores having a pore diameter of not smaller than 350 Å is not more than 20% of the total volume of the pores.

26. A process for producing a catalyst composition for the hydrogenation of heavy hydrocarbon oil as in claim 18, wherein the volume of pores having a pore diameter of not smaller than 350 Å is not more than 15% of the total volume of the pores.

27. A process for producing a catalyst composition for the hydrogenation of heavy hydrocarbon oil as in claim 18, wherein the ratio (mm$^2$/mm$^3$) of the outer surface area of the molded catalyst particle to the volume thereof is in the range of 3.5 to 7.

28. A process for producing a catalyst composition for the hydrogenation of heavy hydrocarbon oil as in claim 18, wherein the total volume of the pores is in the range of 0.5 to 0.9 ml/g.

29. A process for producing a catalyst composition for the hydrogenation of heavy hydrocarbon oil as in claim 18, wherein the active ingredient for hydrogenation is an active metal component for hydrogenation supported on the porous refractory oxide carrier which is at least one member selected from the group consisting of metals of Group VIb of the Periodic Table or compounds of said metals and at least one member selected from the group consisting of metals of Group VIII of the Periodic Table or compounds of said metals.

30. A process for producing a catalyst composition for the hydrogenation of heavy hydrocarbon oil as in claim 18, wherein the amount of the active ingredient selected from among metals of Group VIb of the Periodic Table is 3 to 28 wt % (in terms of metal oxide).

31. A process for producing a catalyst composition for the hydrogenation of heavy hydrocarbon oil as in claim 18, wherein the amount of the active ingredient selected from among metals of Group VIII of the Periodic Table is 2 to 6 wt % (in terms of metal oxide).

32. A process for producing a catalyst composition for the hydrogenation of heavy hydrocarbon oil as in claim 18, wherein the active ingredient selected from Group VIb of the Periodic Table is chromium, molybdenum or tungsten.

33. A process for producing a catalyst composition for the hydrogenation of heavy hydrocarbon oil as in claim 18, wherein the active ingredient selected from Group VIII of the Periodic Table is iron, cobalt, nickel or platinum.

34. A process for producing a catalyst composition for the hydrogenation of heavy hydrocarbon oil as in claim 18, wherein the heavy hydrocarbon oil is a topping residual oil or a vacuum residue of crude oil, a synthetic oil obtained by subjecting oil shale, tar sand or bitumen to extraction; a desulfurized heavy oil obtained by directly treating crude oil by a desulfurizing process; a deasphalted oil obtained by treating crude oil by a solvent deasphalting process, a product oil from the liquefaction of coal, a residual oil obtained from the above-recited processes; or a mixture of the above oils.

* * * * *